United States Patent
Quinn

[54] LINEAR ELECTRIC GENERATING SYSTEM

[75] Inventor: James M. Quinn, Hillsburgh, Canada

[73] Assignee: The Raymond Lee Organization, Inc., New York, N.Y. ; a part interest

[21] Appl. No.: 798,401

[22] Filed: May 19, 1977

[51] Int. Cl.² ............................................. H02K 35/00
[52] U.S. Cl. .................... 104/292; 310/13; 104/148 R; 191/10; 105/35
[58] Field of Search .................. 310/12, 15, 13, 14; 104/198 R, 198 LM; 290/3; 361/236; 191/10; 105/35; 246/63 C, 63 R

[56] References Cited

U.S. PATENT DOCUMENTS

| | | | |
|---|---|---|---|
| 1,702,997 | 2/1929 | Ewing et al. | 310/15 X |
| 2,409,857 | 10/1946 | Hines et al. | 310/18 |
| 3,353,131 | 11/1967 | Stubbs et al. | 310/134 |
| 3,701,321 | 10/1970 | Lee | 104/148 LM |

Primary Examiner—Donovan F. Duggan
Attorney, Agent, or Firm—Daniel Jay Tick

[57] ABSTRACT

Magnets are mounted on the undercarriage of a railroad vehicle and produce a magnetic field. Coils are mounted between the rails of a railroad track and extend in the same direction as the rails. The coils are positioned in the magnetic field generated by the magnets, so that as the magnetic field moves along the coils, it produces electrical energy in said coils. An electrically conductive output is electrically connected to the coils for deriving the electrical energy produced in the coils.

1 Claim, 3 Drawing Figures

LINEAR ELECTRIC GENERATING SYSTEM

BACKGROUND OF THE INVENTION

The present invention relates to a linear electric generating system. More particularly, the invention relates to a linear electric generating system powered by a railroad vehicle moving along a railroad track. The railroad vehicle has an undercarriage and wheels. The wheels roll along the rails of the railroad track and the undercarriage is spaced above the rails in the area between the rails.

Objects of the invention are to provide a linear electric generating system of simple structure, which is inexpensive in manufacture, installed with facility and convenience on new and existing railway equipment and right-of-ways, and functions efficiently, effectively and reliably to produce electrical energy, as a railroad vehicle moves, without atmospheric pollution and without the need for fuel other than that used to power the railroad vehicle.

BRIEF DESCRIPTION OF THE DRAWINGS

In order that the invention may be readily carried into effect, it will now be described with reference to the accompanying drawings, wherein.

Figure 1:
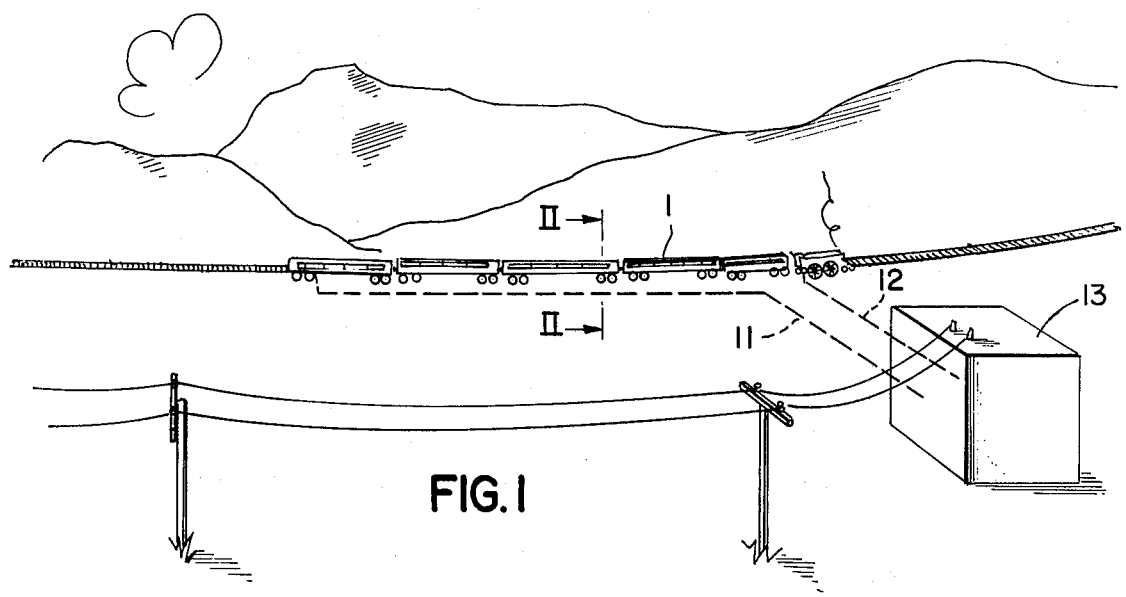
FIG. 1 is a view of a railroad vehicle and the output device of the linear electric generating system of the invention.
Figure 2:
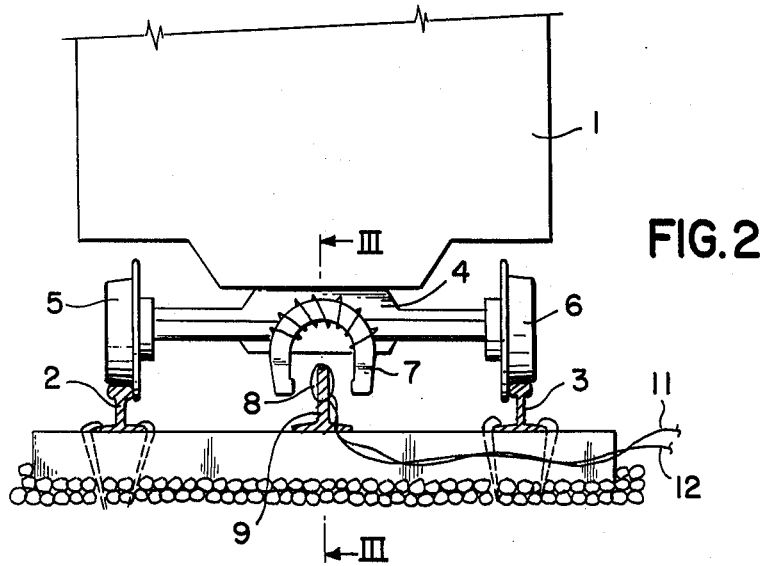
FIG. 2 is an end view of an embodiment of the linear electric generating system of the invention.

DETAILED DESCRIPTION OF THE INVENTION:

The linear electric generating system of the invention is powered by a railroad vehicle 1 (FIGS. 1 and 2) moving along a railroad track having spaced parallel rails 2 and 3 (FIG. 2). The railroad vehicle 1 may comprise one or more units of rolling equipment such as, for example, one or more railroad cars.

The railroad vehicle 1 has an undercarriage 4 and wheels 5, 6, and so on (FIG. 2). The wheels roll along the rails 2 and 3 of the railroad track and the undercarriage 4 is spaced above the rails 2 and 3 and the area between said rails.

The linear electric generating system of the invention comprises a plurality of electromagnets, of which one electromagnet 7 is shown in FIG. 2, mounted on the undercarriage 4 of the railroad vehicle 1 and producing a magnetic field. The electromagnets may comprise any suitable electromagnets of the type used in electric generators and motors.

Figure 3:
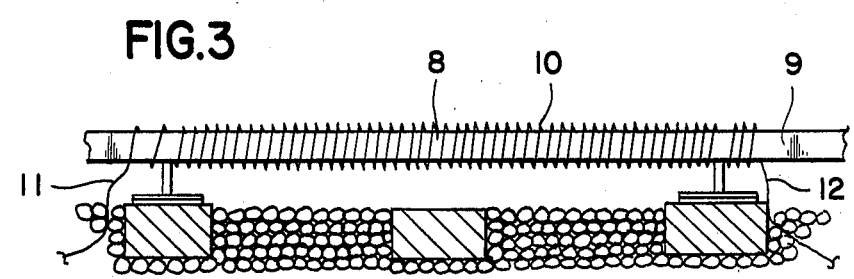
FIG. 3 is a side view, of an embodiment of the coil device of the linear electric generating system of the invention.

A coil device 8 (FIGS. 2 and 3) is mounted between the rails 2 and 3 and extends in the same direction as said rails. The coil device preferably comprises a third rail 9 (FIGS. 2 and 3) of electrically non-conductive material equidistantly spaced between and substantially parallel to the rails 2 and 3 of the railroad track. The third rail 9 is electrically insulated from ground and has an electrically conductive coil 10 (FIG. 3) wound thereon. The coil 10 may comprise any suitable type usually utilized in electric generators and motors, but extending linearly, rather than being wound in the manner of electric motors and generators.

The coil device is positioned, as shown in FIG. 2, in the magnetic field generated by the magnets 7, and so on, so that as the magnetic field produced by the magnets moves along the coil device, with the movement of the railroad vehicle 1, said magnetic field produces electrical energy in said coil device.

An output conductive device comprises electrical conductors 11 and 12 electrically connected to the coil 10 of the coil device 8 for deriving the electricl energy produced in said coil and supplying such electrical energy to an electrical distribution and/or storage plant 13 (FIG. 1).

While the invention has been described by means of a specific example and in a specific embodiment, I do not wish to be limited thereto, for obvious modifications will occur to those skilled in the art without departing from the spirit and scope of the invention.

I claim:

1. A linear electric generating system powered by a railroad vehicle moving along a railroad track, said railroad vehicle having an undercarriage and wheels, said wheels rolling along the rails of the railroad track and said undercarriage being spaced above said rails and the area between said rails, said linear electric generating system comprising magnet means mounted on the undercarriage of the railroad vehicle and producing a magnetic field;

coil means mounted between the rails and extending in the same direction as said rails, said coil means being positioned in the magnetic field generated by the magnet means whereby as the magnetic field moves along said coil means, said magnetic field produces electrical energy in said coil means, said coil means comprising a third rail of electrically non-conductive material equidistantly spaced between and substantially parallel to the rails of the railroad track, said third rail being electrically insulated from ground, and an electrically conductive coil wound on said third rail; and output conductive means electrically connected to the coil means for deriving the electrical energy produced in said coil means.

* * * * *